United States Patent
Borgmann et al.

[19]

[11] Patent Number: 5,914,539
[45] Date of Patent: Jun. 22, 1999

[54] MOTOR VEHICLE ELECTRICAL CONTROL SYSTEM

[75] Inventors: Uwe Borgmann, Recklinghausen; Reiner Janca, Dorsten, both of Germany

[73] Assignee: Leopold Kostal GmbH & Co. KG, Ludenscheid, Germany

[21] Appl. No.: 08/972,493

[22] Filed: Nov. 18, 1997

[30] Foreign Application Priority Data

Dec. 5, 1996 [DE] Germany .............................. 196 50 381

[51] Int. Cl.$^6$ ........................................................ G06F 11/20
[52] U.S. Cl. .......................... 307/38; 307/31; 307/10.1; 307/35; 307/39; 701/36
[58] Field of Search ..................... 307/31, 38, 10.1, 307/35, 39; 701/36

[56] References Cited

U.S. PATENT DOCUMENTS

| | | | |
|---|---|---|---|
| 4,471,232 | 9/1984 | Peddie et al. | 307/35 |
| 4,639,609 | 1/1987 | Floyd et al. | 307/10.1 |
| 4,663,539 | 5/1987 | Sharp et al. | 307/38 |
| 4,682,294 | 7/1987 | Duc et al. | 307/38 |
| 5,373,197 | 12/1994 | Ptacek et al. | 307/31 |
| 5,637,933 | 6/1997 | Rawlings et al. . | |

FOREIGN PATENT DOCUMENTS 44 40 280 A1  5/1996  Germany .

*Primary Examiner*—Albert W. Paladini
*Attorney, Agent, or Firm*—Brooks & Kushman P.C.

[57] ABSTRACT

A motor vehicle electrical control circuit for controlling energy consumption units includes a microcomputer, semiconductor output amplifiers, and control circuits. Each of the output amplifiers is connected to a respective one of the consumption units for providing electrical energy to the units. The control circuits are connected to the microcomputer and to a respective one of the output amplifiers for controlling the electrical energy provided to the consumption units. The control circuits generate a measurement signal indicative of a variable of the respective one of the output amplifiers. The computer systems process the measurement signals to determine if either a critical change or a sub-critical change of the variable has occurred. The associated control circuit shuts off the electrical energy provided by the respective one of the output amplifiers to the respective consumption unit in the event of a critical change and activates a security function stored in the computer system to vary the electrical energy provided to the respective consumption unit in the event of a sub-critical change.

11 Claims, 1 Drawing Sheet

U.S. Patent    Jun. 22, 1999    5,914,539
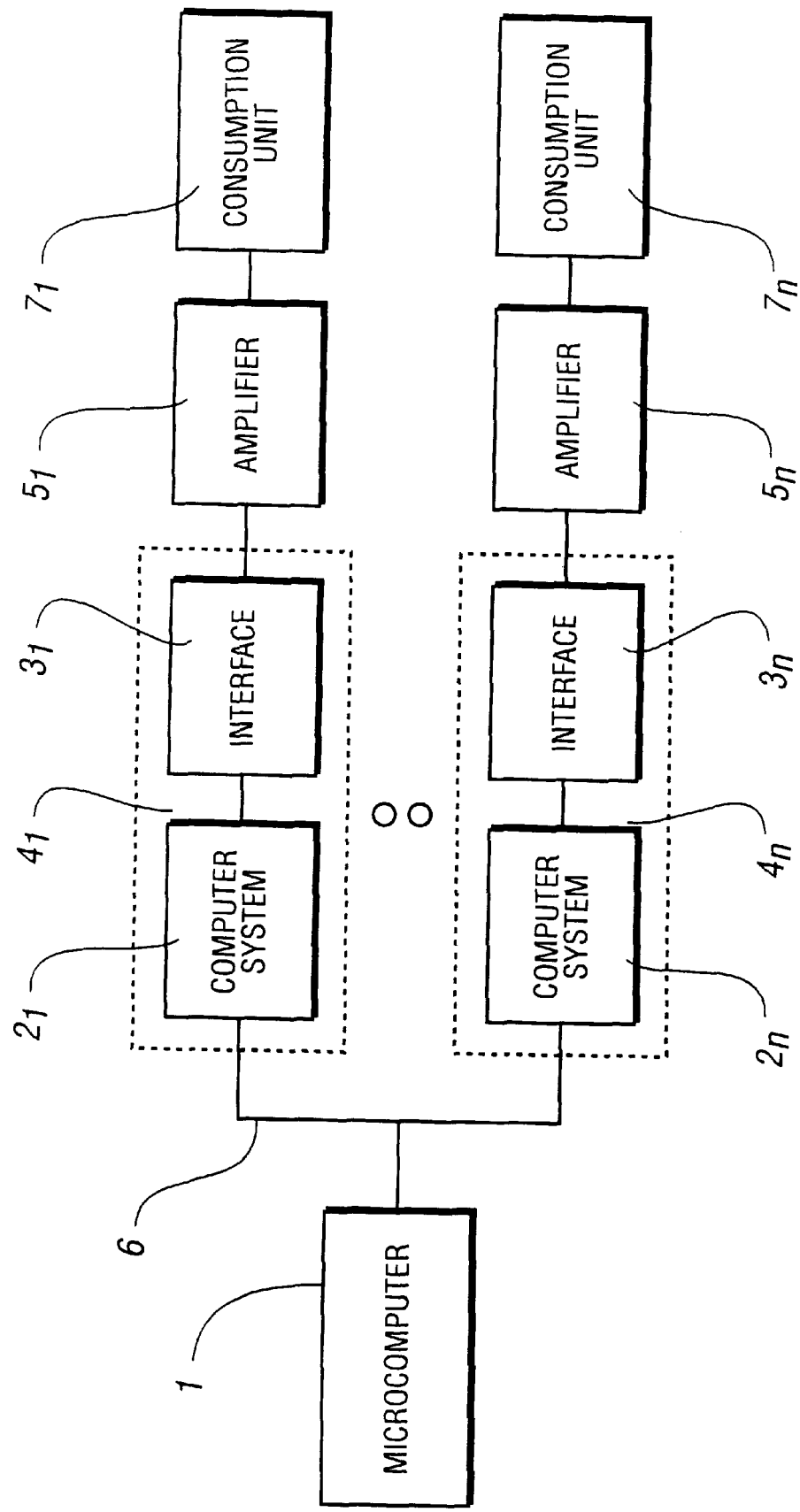

MOTOR VEHICLE ELECTRICAL CONTROL SYSTEM

TECHNICAL FIELD

The present invention is related to motor vehicle electrical control systems for controlling motor vehicle energy consumption units such as pumps, motors, and lights.

BACKGROUND ART

Motor vehicle electrical control systems control the electrical energy provided to electric energy consumption units in a motor vehicle. The consumption units include servo pumps, fuel pumps, fan motors, and lamps for the headlights, sidelights, and indicator lights. A typical control system includes a microcomputer which influences output amplifiers associated with the consumption units to vary the electrical energy provided to the units by the output amplifiers. In so doing, it is important that the consumption units and the output amplifiers connected thereto are protected from being overloaded.

To protect the consumption units from being overloaded, protective circuits have been connected directly to semiconductor output amplifiers to measure the voltage and current of the electrical energy provided to the consumption units by the output amplifiers and the temperature of the heat generated by the output amplifiers. In effect, the semiconductor output amplifier simultaneously performs safety functions.

Output amplifiers of this type are, however, quite cost intensive and have only a relatively limited use as far as their safety characteristics are concerned.

SUMMARY OF THE INVENTION

Accordingly, it is an object of the present invention to provide a motor vehicle electrical control system having output amplifiers which use standard components and which guarantees that energy consumption units and output amplifiers are protected.

In carrying out the above object and other objects, the present invention provides an electrical control system for use in motor vehicle electrical systems to control a plurality of energy consumption units. The control system includes a microcomputer and a plurality of semiconductor output amplifiers. Each one of the semiconductor output amplifiers is connected to a respective one of the energy consumption units for providing electrical energy to the energy consumption units.

The control system further includes a plurality of control circuits for controlling the electrical energy provided to the energy consumption units by the semiconductor output amplifiers. Each one of the control circuits has a computer system and an interface device. The computer systems are connected to the microcomputer by a communications channel. Each of the interface devices is connected to a respective one of the semiconductor output amplifiers for generating a measurement signal indicative of a physical variable of the respective one of the semiconductor output amplifiers.

The computer systems process the measurement signal to determine if either a critical change or a sub-critical change of the physical variable has occurred. The control circuit controls the respective one of the semiconductor output amplifiers to shut off the electrical energy provided to the respective energy consumption unit in the event of a critical change and activates a security function to vary the electrical energy provided to the respective energy consumption unit in the event of a sub-critical change. The microcomputer programs the security function into the control circuit.

The advantages accruing to the present invention are numerous. The electrical control system sets any security characteristics in the case of a lower loading of the microcomputer and readily guarantees the possibility of a pulse width modulation (PWM) control.

These and other features, aspects, and embodiments of the present invention will become better understood with regard to the following description, appended claims, and accompanying drawings.

BRIEF DESCRIPTION OF THE DRAWING

The FIGURE is a block diagram of the circuit layout of the present invention.

BEST MODE FOR CARRYING OUT THE INVENTION

Referring now to the FIGURE, the motor vehicle electrical control system of the present invention is shown. The control system includes a microcomputer 1 connected to a plurality of control circuits $4_1$–$4_n$ by a communications channel 6. Each one of control circuits $4_1$–$4_n$ is connected to a respective one of a plurality of electric energy consumption units $7_1$–$7_n$. Each of consumption units $7_1$–$7_n$ includes a semiconductor output amplifier $5_1$–$5_n$. Semiconductor output amplifiers $5_1$–$5_n$ provide electrical energy to their respective consumption unit $7_1$–$7_n$.

Each control circuit $4_1$–$4_n$ controls the electrical energy provided by output amplifiers $5_1$–$5_n$ and protects the output amplifiers against power overloading. Each control circuit $4_1$–$4_n$ includes a computer system $2_1$–$2_n$ connected to microcomputer 1 and an interface device $3_1$–$3_n$ allocated to the microcomputer and connected to a respective output amplifier $5_1$–$5_n$.

Interface devices $3_1$–$3_n$ can measure physical variables of output amplifiers $5_1$–$5_n$ such as the electrical voltage and current of the energy provided by the amplifiers and the temperature of the heat generated by the amplifiers. Interface devices $3_1$–$3_n$ generate a measurement signal indicative of the measured physical variables.

Computer systems $2_1$–$2_n$ process the measurement signal and determine whether any critical or sub-critical changes have occurred in the variables with respect to time. In the event of computer systems $2_1$–$2_n$ determining a critical change, control circuit $4_1$–$4_n$ shuts off the electrical energy provided by the relevant output amplifier to the respective consumption units $7_1$–$7_n$. This reaction is performed directly by virtue of the hardware of interface devices $3_1$–$3_n$. In the event of computer systems $2_1$–$2_n$ determining a sub-critical change, control circuit $4_1$–$4_n$ activates a security function stored in computer systems $2_1$–$2_n$ to vary the electrical energy provided by the relevant output amplifier to the respective consumption units $7_1$–$7_n$.

Microcomputer 1 programs the security function into control circuit $4_1$–$4_n$ through communication channel 6. Communication channel 6 is a serial and/or parallel interface. The security functions are activated to vary the electrical energy provided to the respective consumption unit in the event of a sub-critical change.

It should be noted in connection with such a design, that owing to the low loss of power output, it is possible to achieve a good level of efficiency. With respect to the formation of such an electrical control circuit, it is advantageous if either the interface devices are ASIC components and the computer systems are microcomputers with limited power output capability or the interface devices and the computer systems are combined together as an ASIC component.

Preferably, output amplifiers $5_1$–$5_n$ are field effect transistors such as MOSFETs which are regarded as standard components.

For controlling the energy provided to consumption units $7_1$–$7_n$, a PWM control is preferably used and may be implemented either into the software of computer systems $2_1$–$2_n$ or into the hardware of interface devices $3_1$–$3_n$.

Finally, it is favorable if microcomputer 1 and computer systems $2_1$–$2_n$ are provided with components which are intended for a mutual monitoring process aimed at a correct functioning and which components initiate necessary counter measures in the case of malfunctions. Communication for the mutual monitoring and the counter measures are achieved by communications channel 6.

Thus it is apparent that there has been provided, in accordance with the present invention, an electrical control system that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. For use in motor vehicle electrical systems, a motor vehicle electrical control system for controlling electrical energy provided to a plurality of energy consumption units of a motor vehicle, the control system comprising:

a microcomputer;

a plurality of semiconductor output amplifiers, each one of the semiconductor output amplifiers being connected to a respective one of the energy consumption units for providing electrical energy to the energy consumption units; and a plurality of control circuits each associated with a respective one of the plurality of semiconductor output amplifiers for controlling the electrical energy provided to the energy consumption units by the semiconductor output amplifiers, each one of the control circuits having a computer system and an interface device by the semiconductor output amplifiers;

the computer systems being connected to the microcomputer by a communications channel;

each one of the interface devices being connected to a respective one of the semiconductor output amplifiers for generating a measurement signal indicative of a variable of the respective one of the semiconductor output amplifiers;

wherein the computer systems process the measurement signals to determine if either a critical change or a sub-critical change of the variable with respect to time has occurred;

wherein the associated control circuit controls the respective one of the semiconductor output amplifiers to shut off the electrical energy provided by the respective one of the semiconductor output amplifiers to the respective energy consumption unit via the interface device in the event of a critical change to protect the consumption unit from being overloaded and activates a security function stored in the computer system to vary the electrical energy provided by the respective one of the semiconductor output amplifiers to the respective energy consumption unit in the event of a sub-critical change to protect the consumption unit from being overloaded;

wherein the microcomputer programs the security function into the computer systems of the associated control circuit.

2. The control system of claim 1 wherein:
the variable is the electric current provided by the respective one of the semiconductor output amplifiers.

3. The control system of claim 1 wherein:
the variable is the electric voltage provided by the respective one of the semiconductor output amplifiers.

4. The control system of claim 1 wherein:
the variable is the temperature generated by the respective one of the semiconductor output amplifiers.

5. The control system of claim 1 wherein:
the interface devices are ASIC components.

6. The control system of claim 1 wherein:
at least one of the computer systems and the respective interface device are combined into an ASIC component.

7. The control system of claim 1 wherein:
the semiconductor output amplifiers are field effect transistors.

8. The control system of claim 1 wherein:
the semiconductor output amplifiers are MOSFETs.

9. The control system of claim 1 wherein:
the communications channel is a serial interface.

10. The control system of claim 1 wherein:
the communications channel is a parallel interface.

11. The control system of claim 1 wherein:
the security function is activated for pulse width modulation control of the electrical energy provided by the semiconductor output amplifiers in the event of sub-critical changes.

* * * * *